Feb. 2, 1926.                                      1,571,231
H. BOLLI
SAW GAUGE
Filed May 11, 1925

Inventor
Henry Bolli
By his Attorney

Patented Feb. 2, 1926.

1,571,231

UNITED STATES PATENT OFFICE.

HENRY BOLLI, OF BRONX, NEW YORK.

SAW GAUGE.

Application filed May 11, 1925. Serial No. 29,324.

*To all whom it may concern:*

Be it known that I, HENRY BOLLI, a citizen of Germany, residing at the Bronx, in the county of the Bronx and State of New York, have invented certain new and useful Improvements in Saw Gauges, of which the following is a specification.

The present invention relates to improvements in saws, particularly hand-saws, and it is the principal object of the invention to provide such saw with gauging means for conveniently gauging the depth of a cut to be made by the saw.

Another object of the invention is the provision of a gauging device for saws allowing a ready adjustment of the gauge rods and locking of the same in their adjusted positions.

A further object of the invention is the provision of a depth gauge for the cuts made by hand and other saws which is of simple and inexpensive construction, and one which may readily be attached to, or removed from a saw.

Further objects and advantages of my invention will become known as the description thereof proceeds and will then be specifically pointed out in the appended claims.

In the accompanying drawing, forming a material part of this disclosure:—

Figure 1:
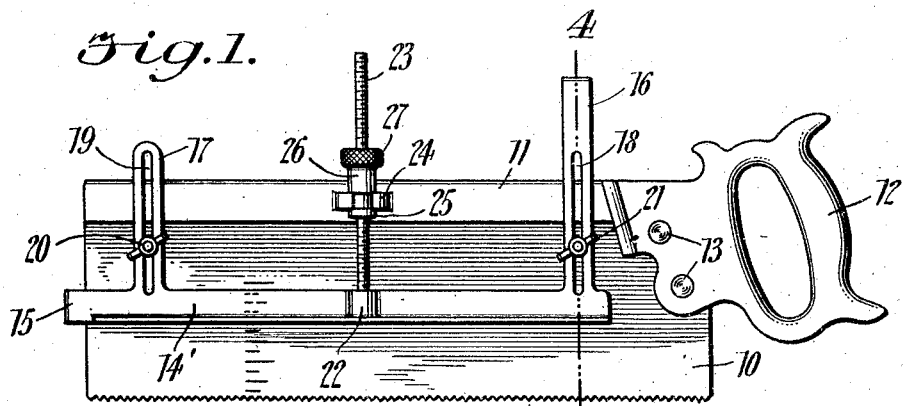
Figure 1 is a side elevation of a hand saw equipped with a gauging device constructed in accordance with the present invention.
Figure 2:
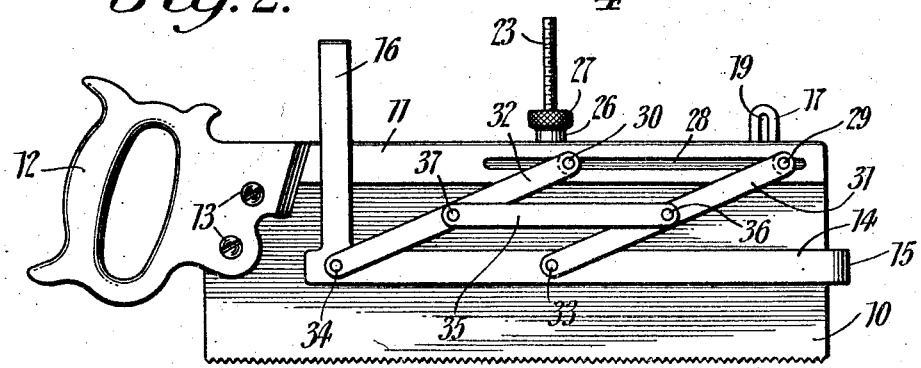
Figure 2 is a similar view seen from the opposite side of the saw.
Figure 3:
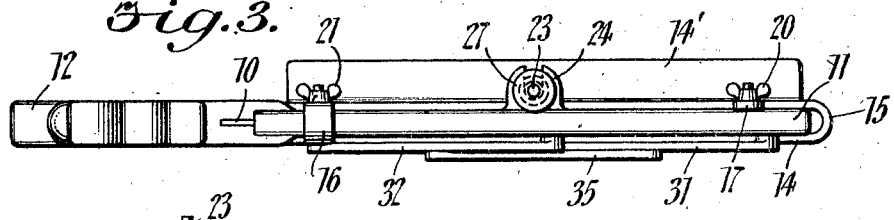
Figure 3 is a top plan view thereof.
Figure 4:
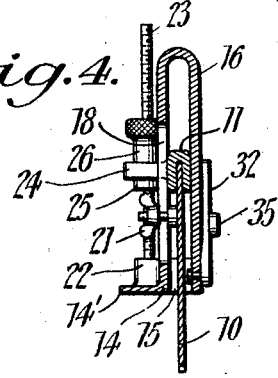
Figure 4 is a cross-section on line 4—4 of Figure 1.

A saw 10 of the form customary to hand-saws having a back 11 and handle 12 attached thereto in the well known manner by screws 13 or the like, is equipped with a gauge comprising a lower rail or gauge rod 14 bent in approximately its center to form two parallel shanks, one on each side of saw blade, connected by the bend 15. The shank 14', on one side of the saw blade 10, has formed therewith, near its ends, vertically disposed uprights 16 and 17 rectangularly disposed to the shank 14' and equipped with longitudinal slots 18 and 19 respectively in which the shafts of adjusting screws travel engaging with their inner ends the saw blade and carrying on their outer ends wing nuts 20 and 21 respectively. Intermediate its ends, and between the uprights 16 and 17, the shank 14' carries a socket 22 adapted to receive the lower end of a threaded bar 23 which is passed intermediate its ends through an eye 24 on the back 11. Below said eye, the bar 23 carries a collar 25 and above the eye a sleeve 26 provided with a knurled operating disc 27.

The head 11 is provided, at the side opposite the above described shank 14' and the parts cooperating therewith, with a longitudinally extending slot 28 in which are guided and travel, the inner ends of pivot pins 29 and 30 of the upper ends of arms 31 and 32, the lower ends of which are pivotally connected, as at 33 and 34 to the rod 14. Intermediate their ends in approximately the middle of arms 31 and 32, the same are connected by an arm 35 pivoted at its ends, as at 36 and 37, to arms 31 and 32 respectively.

The device operates as follows:—

After the desired depth of a cut has been determined, gauge rods 14 and 14' are properly adjusted, as the holding devices have been previously loosened and are then locked in their properly adjusted positions by the correct manipulation of the wing nuts 20 and 21 and the tightening of sleeve 26 on eye 24 by the proper manipulation of the knurled disc 27. It will be clear that any change in the depth of a cut desired may quickly be effected by loosening the tightening nuts and sleeve and thereafter tightening the same again.

It will be understood that the embodiment of my invention is by way of example only, and that such changes may be made as fall within the scope of the appended claims without departing from the spirit of my invention, as for instance, the gauge rod could be arranged on one side of the blade only, etc.

Having thus described my invention, what I claim as new and desire to secure by Letters Patent, is:—

1. A gauge for controlling the depth of saw cuts comprising gauge rods, a system of pivoted arms connected with one of the gauge rods on one side of the saw, and two longitudinally slotted uprights on the other gauge rod on the opposite side of the saw, a socket on said latter gauge rod, a threaded rod adapted to engage with its lower end into said socket, means traveling in the slots of said uprights and adapted to carry locking means for locking the parts in their adjusted positions, and a sleeve having a knurled operating disc for adjusting the parts to the proper distance from the work piece.

2. A gauge for controlling the depth of cuts to be made by a hand saw comprising a gauge rod bent upon itself to form a parallel shank on each side of the saw blade, a longitudinally slotted back for the saw blade, pivot pins displaceable in said slot, and arms to the upper ends of which said pins are secured, the lower ends of said arms pivotally connected to one of the shanks of said gauge rod, a third arm pivotally connected at its ends to the aforesaid arms intermediate their ends, and means for cooperating with the other of said gauge shanks to allow an adjustment of the gauge rods to the proper distance from the work piece, and means for locking the parts in their adjusted positions.

In witness whereof I have affixed my signature.

HENRY BOLLI.